July 12, 1938.  C. R. RANEY  2,123,547

SICKLE DRIVE FOR HARVESTERS

Filed July 6, 1936  2 Sheets-Sheet 1

Inventor
Clemma R. Raney
By I. F. Lassague
Atty.

July 12, 1938.　　　　C. R. RANEY　　　　2,123,547
SICKLE DRIVE FOR HARVESTERS
Filed July 6, 1936　　　2 Sheets-Sheet 2
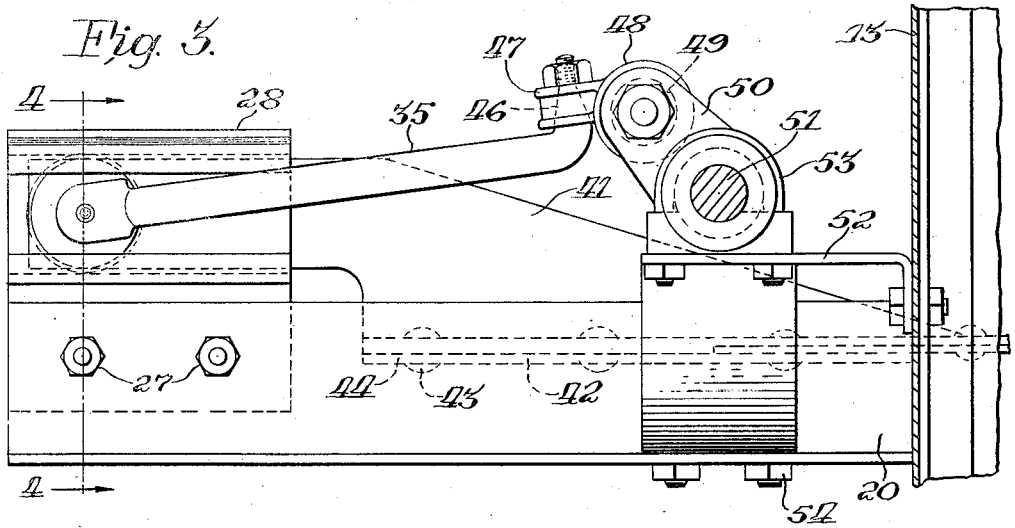
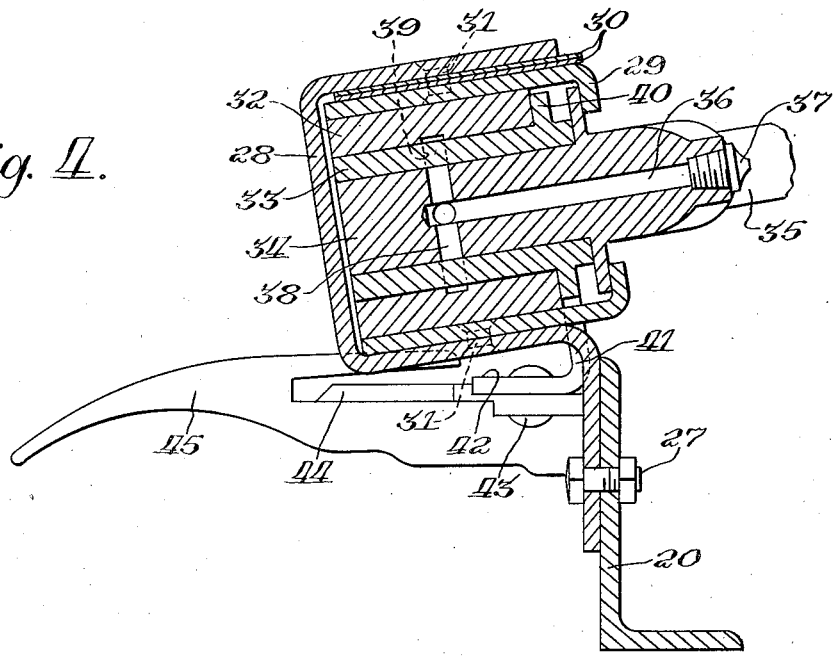
Inventor
Clemma R. Raney
By
Atty.

Patented July 12, 1938

2,123,547

UNITED STATES PATENT OFFICE 2,123,547

SICKLE DRIVE FOR HARVESTERS

Clemma R. Raney, Riverside, Ill., assignor to International Harvester Company, a corporation of New Jersey Application July 6, 1936, Serial No. 89,072

6 Claims. (Cl. 56—122)

The invention relates to an improved drive mechanism for the sickle, or knife, as utilized in harvesters.

In such machines as harvester threshers, harvester headers, harvester binders, and the like, employing a harvester platform along the front end of which is a transverse frame angle bar, there is usually disposed on such bar a cutting mechanism including guard fingers and a reciprocating knife, or sickle. The means for reciprocating the knife, or sickle, is usually in the form of a fly-wheel or crank including a knife-head or pitman connected to reciprocate the knife. In the past it has been the practice to locate this crank, or fly-wheel, forwardly of the transverse angle bar at the front of the platform and this necessitated the use of a relatively heavy and large runner shoe or bowl structure for shielding the crank or fly-wheel to prevent the same from being damaged when the cutting apparatus was cutting low, so that objects on the ground, or the ground itself, could not cause damage or injury to such driving mechanism by contacting the same as the harvester moved through the field.

It is desirable to improve such sickle driving mechanism by eliminating as much weight therefrom as possible without sacrificing strength, to the end that the machine will be lighter in construction and cheaper to produce.

The object of this invention generally is to simplify the construction of the driving mechanism for a sickle of the type specified.

Another object of the invention is to utilize the platform angle bar itself as a shield or guard for the driving mechanism, thereby making it possible to eliminate the usually heavy and forwardly extending shield which serves to protect the fly-wheel, or crank, used in driving the sickle.

Another object of the invention is to locate the fly-wheel, or crank, behind the platform angle bar in relation to the direction of travel of the harvester.

Another object is to provide an improved guiding means associated with said platform angle bar to guide the stroke of the pitman and knife-head used in driving the knife, or sickle.

Other important objects will become apparent to those skilled in the art as the disclosure is more fully made.

Briefly, these desirable objects are accomplished in connection with a harvester platform structure having a transverse angle bar at the front end carrying guard fingers for cutting apparatus which also includes a knife mounted on the guard fingers for reciprocatory movement. The stubbleward end of the angle bar carries a guide box in which is located a roller mounted in a carrier including a knife-head connected to the knife, there further being provided a pitman connected to the roller structure for moving the same to and fro in its guide box by means of a crank or equivalent fly-wheel, said crank being located behind the platform angle bar in relation to its direction of movement as the harvester advances through the field in cutting a crop. By such construction, the fly-wheel, or crank, is located in such a manner that a stubbleward extension of the platform angle bar serves to shield the crank so that it cannot be damaged.

In the accompanying sheets of drawings, for the sake of illustration only, there has been shown a harvester of the harvester thresher type. In the drawings:

Figure 3 is an enlarged rear elevational view, with parts in section, of the driving mechanism for the sickle, taken along the line 3—3 of Figure 1 and looking in the direction of the arrows; and, Figure 4 is a vertical cross sectional view through the roller and guide, taken along the line 4—4 of Figure 3 looking in the direction of the arrows.

Figure 2:
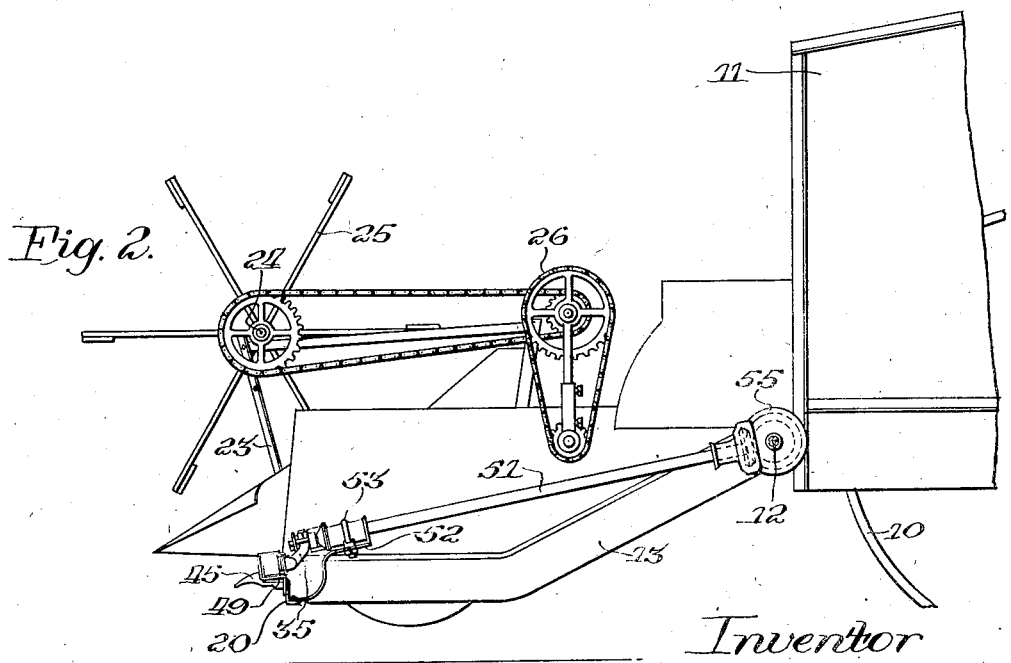
Figure 2 is a general side elevational view of the structure shown in Figure 1 and in addition a portion of the thresher part also is shown.

As has been stated, for the sake of illustration only there is shown a typical harvester of the harvester thresher type which, as shown in Figure 2, is carried on a supporting wheel 10. The thresher part of the machine is shown at 11, the same being rigidly mounted on the wheel carriage, and at the forward end of said thresher part is a transverse shaft 12 for hingedly carrying for up and down movement a feeder housing 13 extending longitudinally in advance of the thresher part 11. The front end of this feeder housing 13 is open and encloses, or carries, a longitudinal feeder conveyor 14.

Figure 1:
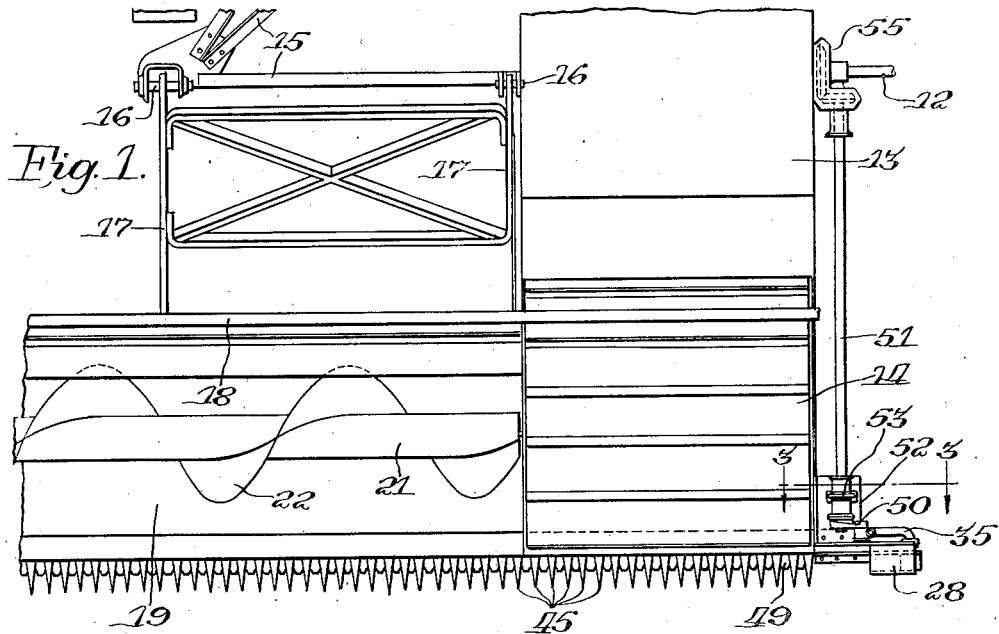
Figure 1 is a general plan view of the harvester part of a harvester thresher showing the sickle across the front end thereof, and the location of the driving mechanism therefor in respect thereto.

At the grainward side of the feeder housing 13 is a frame structure 15 which extends transversely in a grainward direction and includes a pair of pivot pins 16 arranged along the same transverse axis, which axis, incidentally, is also coincident with the axis of the shaft 12. Pivotally hung from these aligned pins 16 is a line lever structure 17, the front end of which is secured to the backboard 18 of a harvester platform structure 19, disposed grainwardly and transversely of the front end of the feeder housing 13. The forward edge of the platform and feeder housing 13 is delineated by a transverse angle bar 20 which, as shown in Figure 1, is extended some distance stubblewardly of the stubbleward side edge of the feeder housing 13. Arranged over the platform 19 is a transverse shaft 21 supported in any suitable manner, the same including an auger conveyor 22 which serves to deliver the cut material received by the platform 19 onto the feeder conveyor 14 which in turn moves the material back through the feeder housing 13 and into the thresher part 11 for the usual threshing treatment. As shown in Figure 2 only and for the sake of illustration, the feeder housing 13 carries supports 23 for mounting a reel shaft 24 carrying a harvester reel 25 over the front edge of the platform 19, which reel may be driven by the sprocket chain drive structure 26 shown in said Figure 2. Since this forms no part of the present invention, it need not be further described.

As shown in Figures 3 and 4, the stubbleward end of the angle bar 20 has secured thereto by bolts 27, a sheet metal housing 28 which is closed at its bottom, front, side, and top, but open along its rear, as shown in Figure 4. Inside this box is a guide box structure 29 which may be adjusted up or down or fore and aft in the main box 28 by means of shims 30. As shown in Figure 4, the box 29, which is really a guide, is fixed within the housing 28 by means of rivets 31. Inside the guide 29 is located a roller sleeve 32 journaled on a bearing sleeve 33 surrounding the right angularly bent pin portion 34 of a pitman 35, the pin portion 34 extending longitudinally and the pitman 35 extending transversely. The longitudinal pin portion 34 of the pitman 35 has a longitudinal bore 36 that may be loaded with lubricant through a nipple 37 which lubricant may work its way through radial bores 38 and through holes 39 formed at angularly spaced points in the bearing sleeve 33 to lubricate the surface where the roller 32 bears and rolls on the outer surface of the bearing sleeve 33.

The bearing sleeve 33 includes a flange 40 which is integrally formed with a knife-head extension 41, which extends transversely in a grainward direction, which extension has a right angular flange 42 disposed horizontally and secured by means of rivets 43 to a reciprocatory knife 44 operable through the usual guard fingers 45 mounted in any conventional manner on and in the usual spaced relation along the length of the platform angle bar 20.

The grainward end of the pitman 35 is bent upwardly at a right angle as at 46, said bent end being secured to an apertured boss 47 extending from a pitman box member 48. The pitman box encloses a pin 49 included in a crank 50 driven from a longitudinal shaft 51 which is journaled on a frame piece 52 and held in place by a U-bolt 53. The frame piece 52, as shown in Figure 3, is attached to the adjacent side wall of the feeder housing 13 and the shield includes a portion connected at 54 to the angle bar 20, as shown in Figure 3, and serves as a guard located below the crank 50. The shaft 51 extends rearwardly along the stubbleward side of the housing 13 and is driven from a bevel gear set 55 operable from the shaft 12 which may be driven from any suitable source of power. Said shaft 51 swings up and down with the housing 13 when it is raised or lowered about the axis of shaft 12, thus permitting the use of a straight shaft 51 without the need of telescopic connections. Further this drive is so arranged as to eliminate the use of universal joints to further simplify the construction. Such simplification is made possible by the fact that the crank and guide and pitman are mounted in the location described. If desired a slip clutch of conventional design may be interposed in the shaft 51 to prevent breakage in the event that the sickle is overloaded.

In operation, it can be seen that the knife 44 extends along the front of the feeder housing 13 and the platform 19 to cut the grain, which cut grain falls back onto the platform and the feeder 14, the grain being delivered by the auger 22 and the feeder 14 to the housing 13 and eventually to the thresher 11. It is to be noted that the crank 15 is located in a vertical plane behind the angle bar 20 in relation to the direction of travel of the harvester. The crank 15 is turned by the shaft 51 which in turn operates the pitman 35 to move the roller 32 to and fro in its housing 31 mounted on the angle bar 20, which roller in turn through its bearing sleeve 33 moves the knife-head 41 to and fro therewith to reciprocate the knife 44.

From this disclosure, it will now be appreciated that an improved sickle drive structure for harvesters has been provided which achieves the desirable objects heretofore cited for the invention.

It is the intention to cover herein all changes and modifications which do not constitute material departures from the spirit and scope of the invention as defined in the appended claims.

What is claimed is:

1. In a harvester, a transverse bar carrying cutting apparatus including a reciprocatory knife, the combination with the knife of means located behind the bar for converting rotary to reciprocating motion, a pitman driven by said means, a channel shaped guide box mounted on the bar, said box being open along its rear face, a roller movable in said box and with which the pitman is connected, a bearing for the roller, and means comprising a knife head movable with the bearing and connected with the knife to drive the same.

2. In a harvester, a transverse bar carrying cutting apparatus including a reciprocatory knife, the combination with the knife of means located behind the bar for converting rotary to reciprocating motion, a pitman driven by said means, a guide box mounted on the bar at a higher level than the knife and being open along its rear face, a bearing including a roller movable in the box and connected to the pitman to be driven thereby, and a knife head connected between said bearing and knife.

3. In a harvester thresher comprising a transverse platform and a longitudinal feeder housing at the stubbleward end thereof, a bar extending transversely in front of the platform and feeder housing with the bar extending stubblewardly of the latter and carrying a reciprocatory knife having a head structure and feeder housing, the combination with said knife of means for converting rotary to reciprocating motion connected to drive the knife and located at the stubbleward side of the feeder housing and behind the knife, said means including a pitman connected to the head structure of the bar and a guide carried on the bar stubblewardly of the feeder housing and receiving the pitman and the head structure of the knife.

4. In a harvester, a transverse bar carrying cutting apparatus including a reciprocatory knife having a head structure, the combination with the knife of means located behind the bar for converting rotary to reciprocating motion, a pitman driven by said means and connected with the head structure to drive the knife, a channel shaped guide for the pitman and the head structure carried on the bar, and means included in the guide whereby the pitman may be adjusted in relation to the driving means.

5. In a harvester thresher comprising a transverse platform and a longitudinal feeder housing at the stubbleward end thereof, a bar extending transversely in front of the platform and feeder housing with the bar extending stubblewardly of the latter and carrying a reciprocatory knife having a head structure in front of the platform and feeder housing, said housing being mounted for up and down movement about a horizontal transverse drive shaft, the combination with said knife of a longitudinal shaft carried alongside the stubbleward side of the housing for driving the knife, said shaft being driven from the transverse pivot shaft and mounted to swing up and down with the housing about its axis, means including a pitman connected with the head structure to drive the knife from said shaft, and a guide for the pitman and the head structure carried on the stubbleward extension of the bar.

6. In a harvester, a transverse bar carrying a reciprocating knife, a bracket behind the knife carried by the bar grainwardly of the stubbleward end of the bar, a shaft including a crank located behind the bar and journaled in said bracket, a channel-shaped guide mounted on the bar stubblewardly of the bracket, said reciprocating knife having a head structure slidable within the channel-shaped guide, and a pitman connecting the crank and the head structure of the knife and being normally within the guide.

CLEMMA R. RANEY.